July 12, 1938.　　　F. I. ROACH　　　2,123,663
POPCORN MACHINE
Filed Nov. 1, 1934　　　4 Sheets-Sheet 4

INVENTOR,
Floyd I. Roach.
BY Harvey & Hamilton
ATTORNEYS.

Patented July 12, 1938

2,123,663

UNITED STATES PATENT OFFICE 2,123,663

POPCORN MACHINE

Floyd I. Roach, Kansas City, Mo., assignor, by mesne assignments, to Popmatic Manufacturing Company, St. Louis, Mo.

Application November 1, 1934, Serial No. 750,946

2 Claims. (Cl. 53—4)

This invention relates to pop corn machines of the type wherein the corn is popped after parts of the machine have been manually operated through the medium of a suitable coin-controlled mechanism, and the primary object of the invention is to provide a novel, unique and efficient pop corn machine having apparatus for employing the method of popping corn disclosed in my application for U. S. Letters Patent filed October 23, 1933, Serial Number 694,828.

One of the important aims of this invention is the provision of a pop corn machine having means for popping corn while it is submerged or suspended below the level of a non-aqueous solution, such as the well known popping oil; means for maintaining the said popping oil at a predetermined level; means for introducing a charge of corn to be popped into the said oil at certain times during the operation of the machine; apparatus for introducing a charge of salt to the popped corn as the latter is being emptied into suitable receptacle; and means for feeding a sack or the like from the machine between the time the unpopped corn is introduced to the popping oil and the time the popping is completed.

A yet further object of this invention is the provision in a pop corn machine having the aforementioned characteristics, of electrical structure which serves to insure that the charge of unpopped corn is introduced into the popping oil after the same has been heated to a predetermined degree, said electrical structure being adapted to operate the container for the popped corn so that it is lifted from the popping oil at the end of the popping action or after the corn has remained in the container for a given length of time.

Other important objects of this invention include unique structure for accomplishing the aforementioned broad aims and these objects, together with a complete description of a pop corn machine embodying one form of the invention will be set forth in the following specification, referring to the accompanying drawings, wherein:

Figs. 6 and 7 are enlarged, fragmentary, detailed views of the latching mechanism employed in the machine.

Fig. 8 is a detailed, fragmentary, sectional view showing one of the switches employed in the machine for controlling the heating element.

Fig. 9 is an enlarged, sectional view showing the heating element, taken on line IX—IX of Fig. 1, and, Fig. 10 is a schematic view showing the wiring system employed in the machine.

Figure 1:
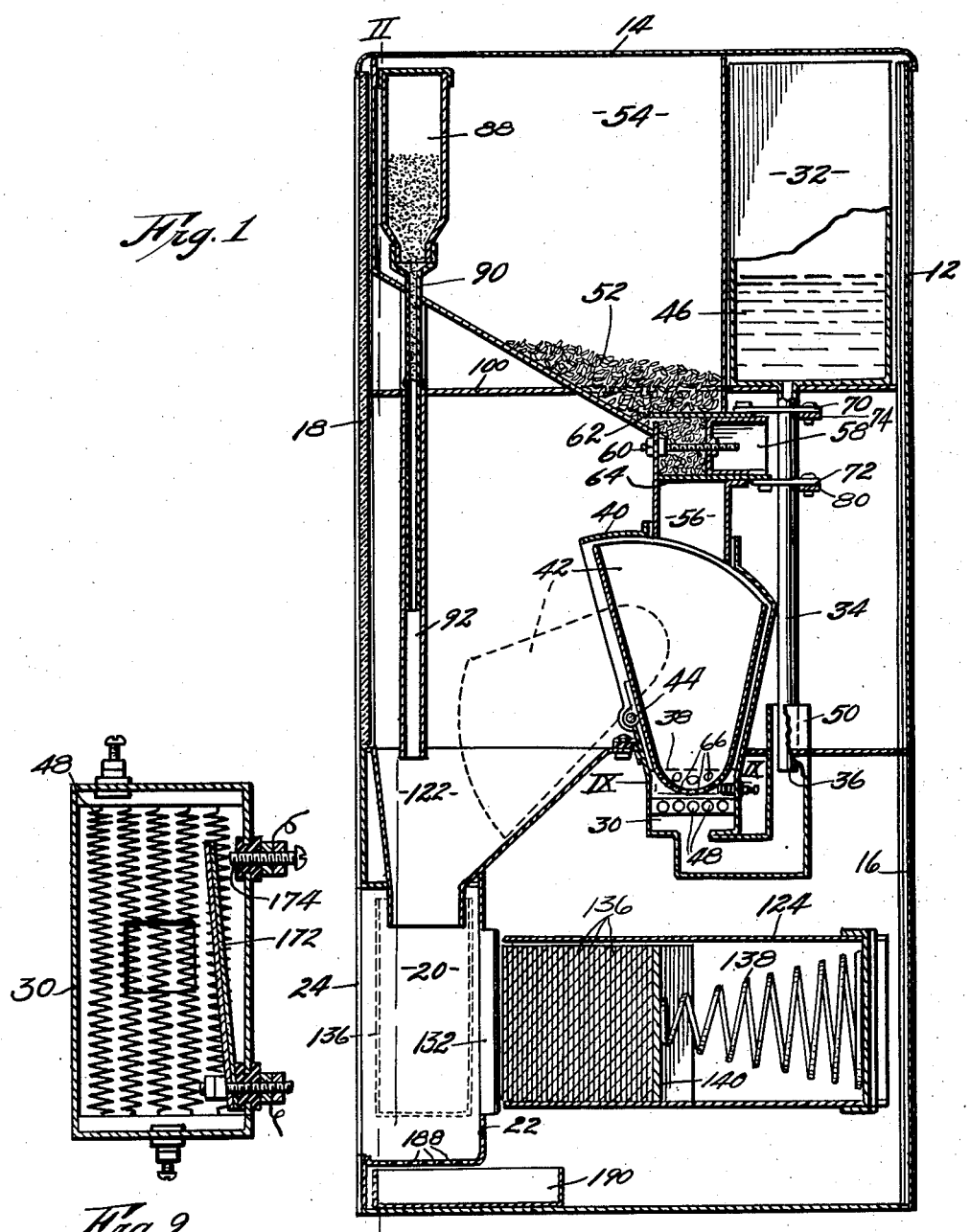
Figure 1 is a vertical, central sectional view through a pop corn machine made in accordance with this invention.
Figure 2:
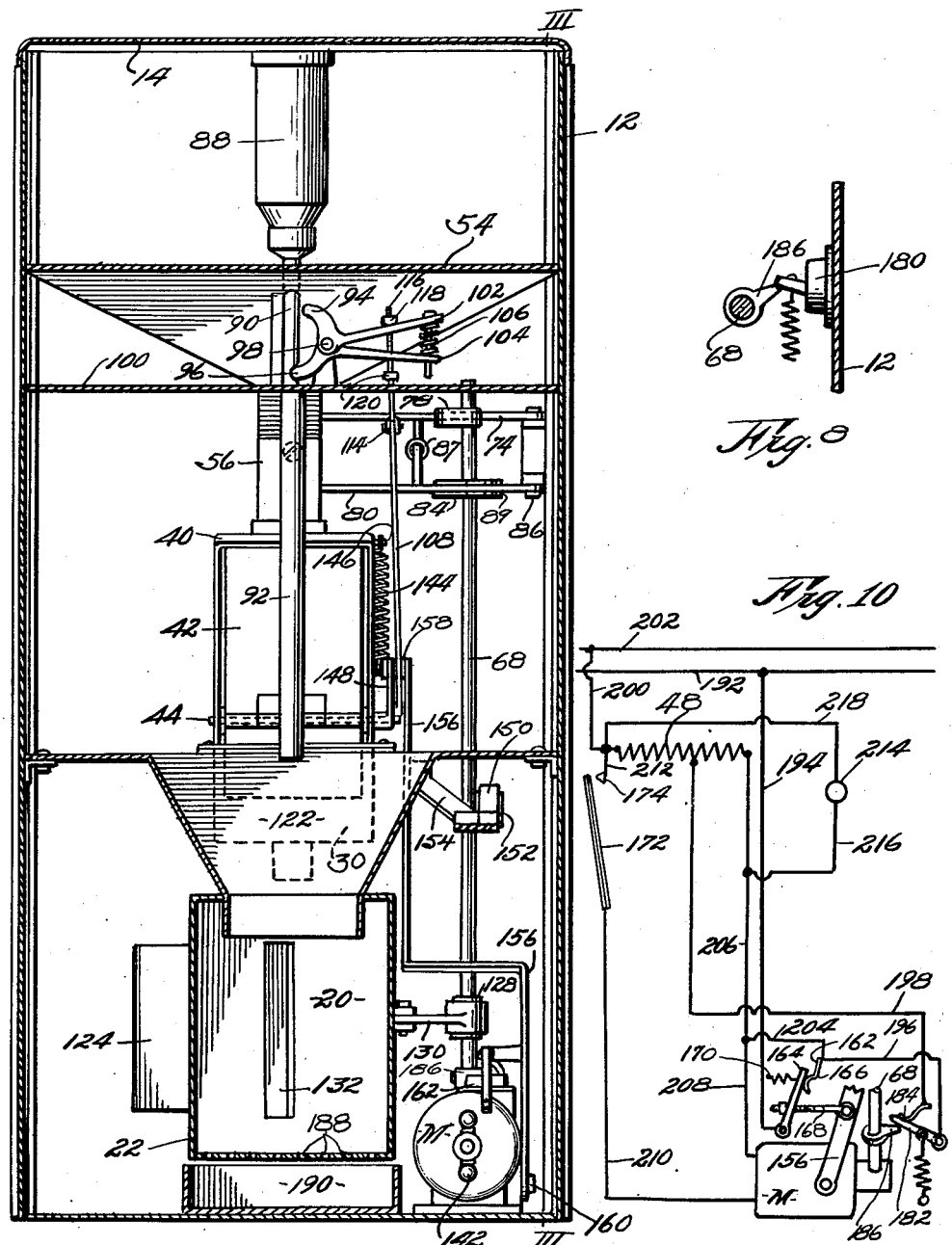
Fig. 2 is a vertical, cross section through the machine, taken on line II—II of Fig. 1.

The case 12 of the pop corn machine is provided with a removable top 14, whereby oil, pop corn and salt might be introduced and another door 16 in the back of the machine is removably affixed so that the sack-carrying receptacle might be filled when necessary.

The front of the machine is provided with a transparent panel 18 so that the operator might view the final steps in the popping operation and the dumping of the popped corn into a suitable chute provided for the purpose. Any form of case 12 might be employed, however, to house the operating parts of the machine, but it is preferable that the case 12 be large enough to permit the formation of a delivery recess 20, set off in case 12 by a housing 22 which is set immediately behind delivery opening 24 formed in the front of case 12 below panel 18. In so constructing case 12, the only projecting parts will be the conventional type coin-receiving mechanism 26 and its manually operable slide member 28. A reservoir 30 within case 12 is adapted to hold a quantity of popping oil which is supplied thereto from storage tank 32 through the medium of a feed conduit 34 which terminates at end 36 that is on oil level 38, below which the unpopped corn is suspended, as will more fully hereinafter be described.

Reservoir 30 extends upwardly to form an enclosure 40 having an open side through which may pass container 42 that is pivotally mounted upon a pintle 44 supported by said enclosure. Oil 46 is fed from storage tank 32 and obviously maintained at level 38 in reservoir 30 through the ordinary well known actions of gravity and liquid level.

In order to heat the popping oil, there is provided a suitable heating element 48 which, in this instance, is within reservoir 30 and submerged within popping oil 46. This heating element comprises a number of coils of resistance wire. These heating elements 48 may be placed in any part of reservoir 30 which has the upwardly turned portion 50 to circumscribe the lower end of conduit 34.

The unpopped corn 52 is stored in a hopper 54 and fed into container 42 through a throat 56 that joins hopper 54 and member 40. A portion of throat 56 has a measuring structure built therein and the size of the charge of corn 52 may be determined by an adjustable regulating member 58 which may be moved back and forth through the medium of the adjusting bolt 60. Upper and lower slides 62 and 64 respectively set off the charge of corn 52 and their operation at proper times allows the introduction of the charge of corn into container 42. When this charge of corn is dropped into container 42, it immediately settles to a position therein below level 38 of popping oil 46 and on to the bottom of container 42 that is below said level 38. Perforations 66 formed through the bottom of container 42 insure that popping oil will be within container 42, but these perforations must be small enough to preclude passing through of the grains of unpopped corn.

A main shaft 68 is rotated at a very low speed by motor M and as this shaft rotates, upper and lower slides 62 and 64 are caused to reciprocate so that when at one end of their paths of travel respectively, they are intersecting the throat 56.

In order to so operate these slides and feed the corn at the proper time, said slides 62 and 64 each have a link 70 and 72 respectively which joins it to a coacting rocker arm. Upper rocker arm 74 has a nose 76 formed thereon, to be engaged by a cam 78 mounted upon shaft 68. Lower rocker arm 80 has a projection 82 thereon for engagement with a cam 84 which is also mounted upon shaft 68 for rotation therewith. Both of these rocker arms 74 and 80 are pivotally affixed at their one end as at 86 to the side of case 12, while the opposite ends thereof join their respective slides 62 and 64 so that they may be operated as shaft 68 turns to cause cams 78 and 84 to engage these arms. The arrangement of this mechanism is such that when lower slide 64 is opened to release a charge of corn, upper slide 62 is closed to hold back corn 52 in hopper 54; then when lower slide 64 is closed, upper slide 62 remains open until the charge of corn flows into the measuring portion of the throat. In the positions shown in Fig. 1, both slides are closed and the machine has just started to operate by the introduction of a coin.

As shaft 68 turns, cam 84 will rotate therewith and as soon as shoulder 85 thereon reaches projection 82, spring 87 which joins together arms 74 and 80 will quickly snap lower slide 64 to the open position; then as the shaft 68 continues to rotate the face of cam 84 will move against projection 82 to return lower slide 64 to the closed position, spring 87 being extended during the operation. Immediately thereafter cam 78 will move against nose 76 and force arm 74 outwardly to move upper slide 62 to the open position. As this action takes place, the concentric face 89 of cam 84 will hold arm 80 in a fixed position so that spring 87 might be stretched in moving arm 74.

Means for supplying a charge of salt is provided in the form of a salt bin 88 that has a flexible tube 90 depending therefrom and in telescoping relation with a tube 92 of some non-corrosive metal. Tube 90 is acted upon by a pair of jaws 94 and 96 so that a charge of salt may be measured and emptied into the popped corn as it is being dumped into a sack or the like held by the operator. These two jaws 94 and 96 are pivotally mounted upon a common pintle 98 carried by transverse partition 100 and each has an arm 102 and 104 extending therefrom, between which is positioned a spring 106 that normally urges these arms apart. A connecting rod 108 joins a part of the hereinafter described mechanism which acts upon container 42 to rock the same from a position where a part of its perforated portion is below the oil level 38 and as connecting rod 108 is moved, it will actuate lever 110 to rock jaws 94 and 96 to and from engagement with tube 90.

Lever 110 is pivotally mounted at its one end to partition 100 as at 112, while its free end is joined as at 114 to rod 116 which has an upper and lower stop 118 and 120 respectively. These stops are adapted to rock jaws 94 and 96 about pivotal point 98 so that the charge of salt set off between the points of contact of these jaws will be fed into chute 122 as the popped corn is dumped. Stops 118 and 120 may be adjusted along the length of rod 116 so that the jaws will position themselves properly as the associated parts of the mechanism are operated. When upper stop 118 is moved upwardly to release its hold upon arm 102, spring 106 will force apart arms 102 and 104 so that both jaws 94 and 96 are in engagement with tube 90. Then, as stop 120 moves up against arm 104 and compresses arm 106, lower jaw 96 will move away from tube 90 and allow the charge of salt confined between the two jaws to drop down as mentioned. Jaw 94 then is holding tube 90 collapsed at its point of contact to preclude salt from passing from bin 88 below that point.

Figure 5:
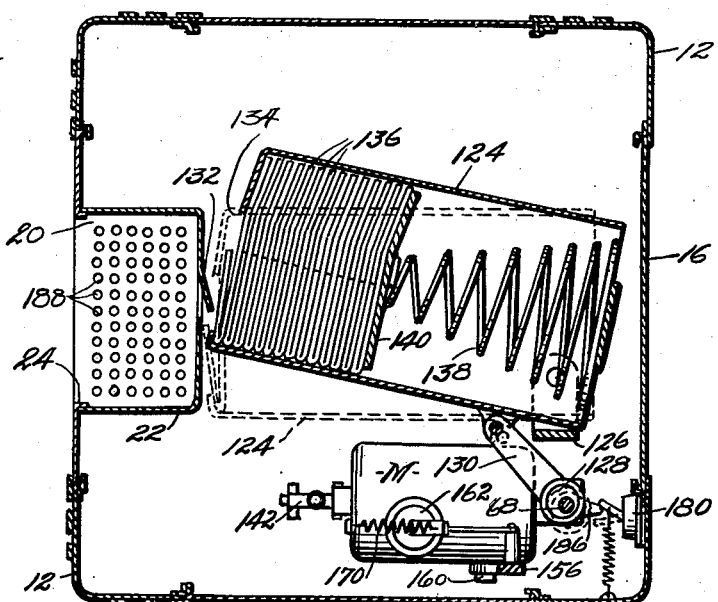
Fig. 5 is a transverse, sectional view, taken on line V—V of Fig. 3.

Novel means for supplying a sack or similar receptacle to the operator of the machine is contemplated by this invention, and the embodiment thereof is clearly shown in the drawings. A magazine 124 is pivotally supported by a bracket 126 so that oscillating motion might be imparted thereto by the rotating shaft 68. An eccentric member 128 mounted on shaft 68 is connected to magazine 124 by arm 130 so as to move one end of magazine 124 to and fro in front of a lip 132 formed on housing 22. This free end of magazine 124 has an opening 134 formed therein so that a part of the sacks or similar containers 136 will project to be caught by lip 132. As such action takes place, the operator may continue the withdrawing operation by grasping the portion of sack 136 which has been projected into housing 122. A spring and plate 138 and 140 respectively should be employed to maintain sacks 136 at the open end of magazine 124. The magazine 124 moves from the position shown in solid lines of Fig. 5 to the dotted line position therein and back to the solid line position during a complete unitary operation of the machine.

Motor M has an ordinary governor 142 thereon to regulate the speed of the motor and the well known type of gear reduction is employed to insure that shaft 68 will make but one complete revolution between the time the oil reaches a predetermined temperature in reservoir 30 and the time the charge of corn 52 is popped. It has been found that this time approximates fifty (50) seconds when the temperature of the oil is 400 degrees F. when the unpopped corn is emptied into the oil.

When the machine is at rest and awaiting operation, container 42 is in an intermediate position between that shown in dotted lines in Fig. 1 and the position thereof illustrated in full lines. This intermediate position is shown in dotted lines in Fig. 3 and the container 42 is held in that position by spring 144 which has one end fixed as at 146 and the other end in connection with crank 148 mounted upon pintle 44 which carries container 42. When the operator moves slide 28 in after inserting the coin, latch 150 will engage dog 152 to preclude withdrawal of member 28. Coupling 154 is in connection with latch 150 and rocker arm 156 and when latch 150 is moved rearwardly to the locked position, rocker arm 156 will be moved to that position shown in Fig. 3. Because link 158 joins crank 148 and the upper end of arm 156, container 42 will be moved to the position shown in full lines of Fig. 1 where its perforated bottom is below the level 38 of the popping oil in reservoir 30. Obviously, arm 156 must be pivotally connected to some stationary member as at 160 so that the aforesaid movement on the part of its one end might take place.

A main switch 162, having points 164 and 166, will be closed when arm 156 is moved as just mentioned. Connection to this switch 162 is made to arm 156 by rod 168 and a spring 170 will move the switch to the open position when arm 156 returns to the point of beginning.

When this switch 162 is closed, heating elements 48 will be energized to heat the oil in reservoir 30. Suitable means must be provided for closing the circuit which supplies electrical energy to motor M when the temperature of the popping oil in reservoir 30 reaches a predetermined temperature, which has been found to be substantially 400 degrees F. A thermostat 172 is a satisfactory means for accomplishing this result, and the same is within reservoir 30 and submerged in the popping oil therein. As soon as the heating elements 48 have raised the temperature of the popping oil to the predetermined degree, thermostat 172 will move against contact point 174 to close the motor circuit. Thereupon, shaft 68 will commence to slowly rotate about its axis and will operate slides 62 and 64 in a manner hereinbefore set down so that a charge of unpopped corn will be emptied into container 42 and be submerged below level 38 of the popping oil.

As the shaft continues to rotate it will further operate the corn feeding mechanism and will also operate magazine 124. Shaft 68 should take the same amount of time to complete one revolution as it takes to pop the charge of corn and, obviously, it will be desired to dump the popped corn as soon as it is popped. Latch 150 is released at the end of the complete revolution of shaft 68 by the interengagement of a pin 176, extending laterally from shaft 68, and a pawl 178 pivotally mounted upon latch 150. When shaft 68 starts to rotate, these members are in the position shown in Fig. 6. When pin 176 is carried around it engages one side of pawl 178, rocks it upwardly, and slides along the inclined side so engaged until its force lifts latch 150 from dog 152.

Figure 3:
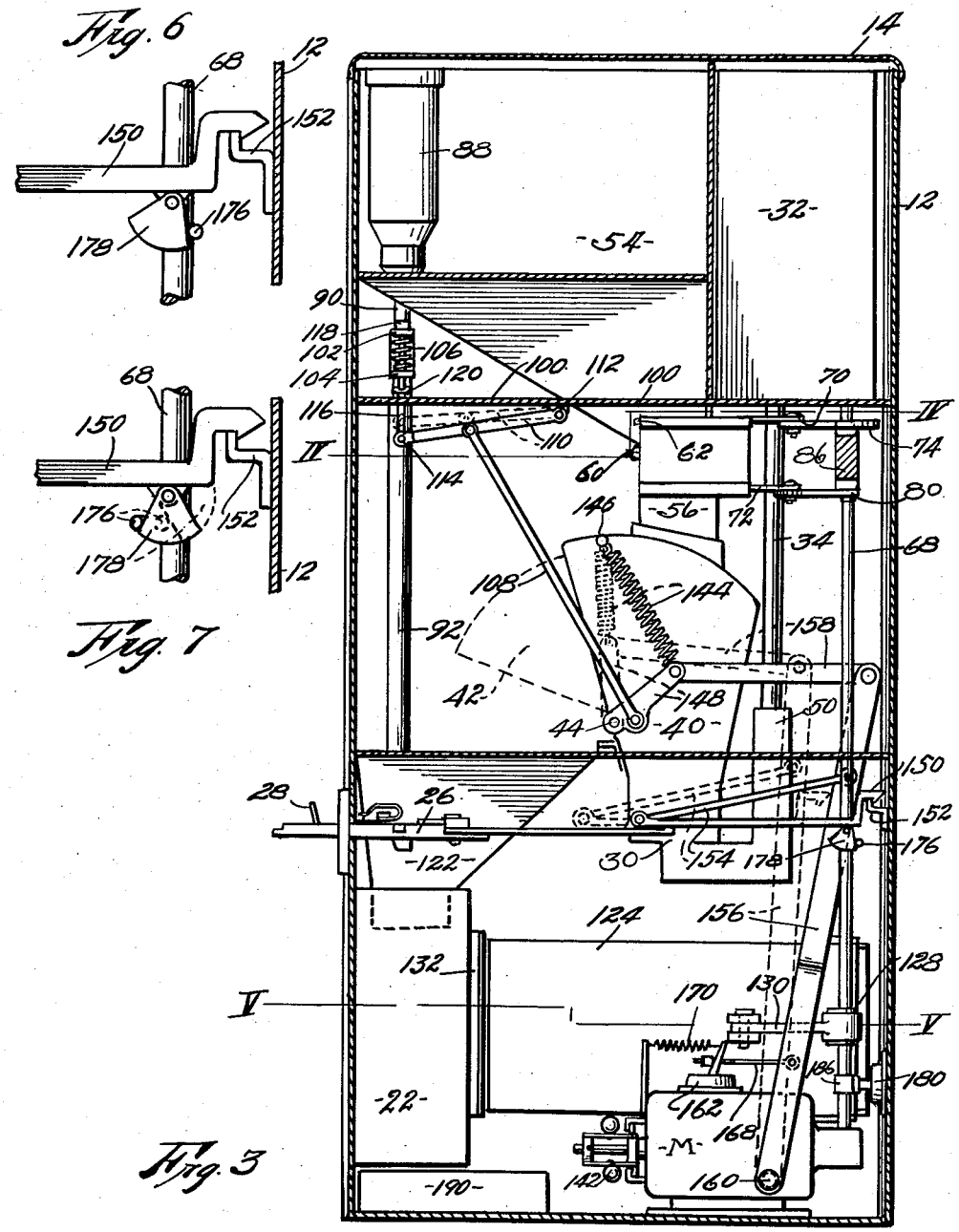
Fig. 3 is a vertical section through the machine, taken along line III—III of Fig. 2.
Figure 4:
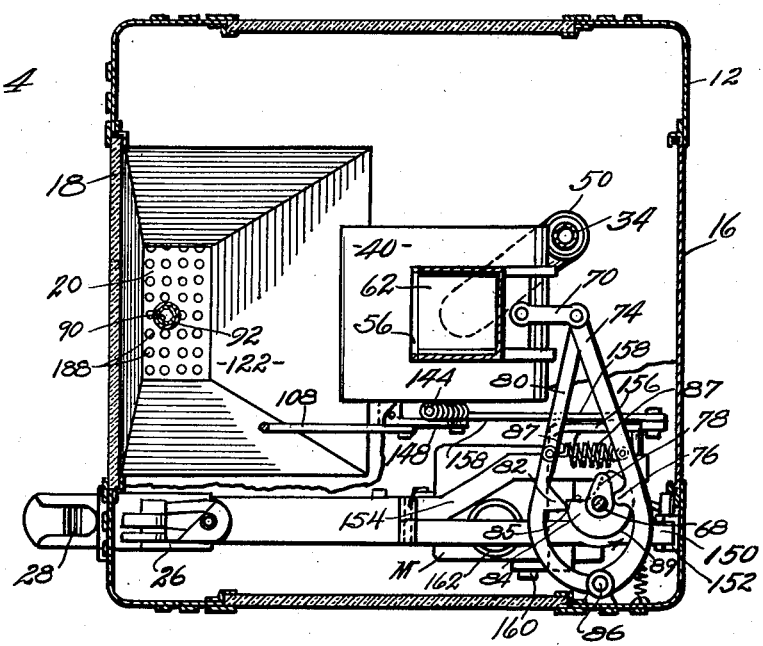
Fig. 4 is a horizontal transverse section through the machine, taken on line IV—IV of Fig. 3.

As soon as this latch is released, spring 144 will move container 42 out of the oil in reservoir 30 and to the intermediate position shown in dotted lines of Fig. 3. Manifestly, all of the parts connected with spring 144, including arm 156, will be brought back to the position shown in dotted lines of Fig. 3 where they may be further moved by pulling outwardly on member 28 for the purpose of dumping the popped corn from container 42 into chute 122 and thence into sack 136 which is positioned in the delivery recess formed within housing 22. As this outward movement is imparted to member 28, crank 48 will be moved so that it will release a charge of salt by moving jaw 96 away from tube 90 in a manner hereinbefore set down.

It has been found desirable to reduce the amount of heating element immediately after the oil has reached the aforesaid predetermined temperature and as soon as motor M starts. A secondary control switch 180, having contact points 182 and 184, is provided to be operated by shaft 68 as it is rotated. A lug 186 engages contact 182 or some associated part to open this switch 180 for the purpose of adding an additional amount of heating element to that being used. This will reduce the amount of heat being imparted to the popping oil by the heating element 48 thereafter in use and will keep the popping oil from overheating, scorching and smoking.

The bottom of housing 22 has perforations 188 formed therethrough and a drip pan 190 may be placed therebeneath for the purpose of gathering any oil or foreign matter that might be dropped from chute 122 when a sack is not in position therebeneath. When member 28 is pulled out as aforesaid, the popped corn is lifted from its floating position on the surface of the oil and dumped from container 42. As soon as 28 is released, spring 144 will draw the parts back to a place where container 42 is in the aforesaid intermediate position.

Reference to Fig. 10 readily indicates the manner in which the main electrical circuits are opened and closed during the operation of the machine. When member 28 is first moved in to start the operation of the machine, a part of heating element 48 is in circuit after switch 162 is closed. The circuit may then be traced as follows: From wire 192 to supply line through wire 194, closed switch points 164 and 166, wire 196 through closed switch points 182 and 184, wire 198 and that portion of heating element 98 between its point of connection and wire 200, and thence through the latter to the other side of the supply line 202.

When switch 180 is opened to increase the amount of resistance used in the heating element to its maximum, the circuit is traced as follows: Wire 192, wire 194, closed switch points 164 and 166, wire 204, wire 206, through all of element 48 to wire 200 and thence back to the other side of the supply line 202.

After the oil has reached its predetermined temperature, thermostat 172 contacts point 174 to close the motor circuit which is traced as follows: Wire 192, wire 194, closed points 164 and 166, wire 204, wire 208 to motor M, wire 210, thermostat 172, point 174, wire 212, wire 200 to the other side of the supply line 202.

It has been found desirable to supply a small light within case 12 behind glass panel 18 and the same is illustrated in the drawings only diagrammatically in Fig. 10. The light bulb 214 may be placed anywhere within case 12 and whenever the machine is in operation, the bulb is burning. This light circuit may be traced as follows: Wire 192, wire 194, closed contacts 164 and 166, wire 204, wire 206, wire 216, bulb 214, wire 218, wire 200 to the other side of the supply line 202.

The relation with respect to time of operation of all the parts of the pop corn machine might be varied slightly, but the form and method of operation hereinbefore set down has been found to be commercially practical and efficient in producing good popped corn, and while the preferred embodiment has been exemplified and described, it is desired to be limited only by the scope of the appended claims.

Having thus described the invention, what is claimed as new and desired to be secured by Letters Patent is:

1. In a pop corn machine of the character described, a reservoir for popping oil; a perforated container movable to and from a position in the reservoir where some of the perforated portion thereof is below the level of said oil; means for so moving the said container; means for introducing a charge of corn into the container; common means for supplying popping oil to the container and maintaining the level of the same appreciably above the said charge of corn as it is being popped; apparatus for moving the said perforated container from the reservoir after the corn has been popped; salt measuring structure; and means for introducing a charge of salt into the popped corn as the latter is being dumped from the container, said salt measuring structure being operable by the said container actuating means as the latter is being operated to move the container to the position in the reservoir.

2. In a pop corn machine of the character described, a reservoir for popping oil; a perforated container movable to and from a position in the reservoir where some of the perforated portion thereof is below the level of said oil; means for so moving the said container; means for introducing a charge of corn into the container; common means for supplying popping oil to the container and maintaining the level of the same appreciably above the said charge of corn; apparatus for moving the said perforated container from the reservoir to dump the popped corn; a magazine to hold a plurality of sacks or the like; and means operable by the said apparatus for feeding one of said sacks from the said magazine after the charge of corn is introduced into said container and before the popped corn is dumped therefrom.

FLOYD I. ROACH.